(12) United States Patent
Alberts

(10) Patent No.: US 12,503,999 B2
(45) Date of Patent: Dec. 23, 2025

(54) METHOD AND DEVICE FOR INDIVIDUALLY PITCHING BLADES OF A WIND TURBINE

(71) Applicant: Siemens Gamesa Renewable Energy A/S, Brande (DK)

(72) Inventor: Johannes Gerhardes Wardjan Alberts, Brøndby Strand (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/727,805

(22) PCT Filed: Nov. 30, 2022

(86) PCT No.: PCT/EP2022/083804
§ 371 (c)(1),
(2) Date: Jul. 10, 2024

(87) PCT Pub. No.: WO2023/134916
PCT Pub. Date: Jul. 20, 2023

(65) Prior Publication Data
US 2025/0092855 A1    Mar. 20, 2025

(30) Foreign Application Priority Data
Jan. 13, 2022   (EP) .................................... 22151367

(51) Int. Cl.
*F03D 7/02*   (2006.01)
(52) U.S. Cl.
CPC ........... *F03D 7/0224* (2013.01); *F03D 7/024* (2013.01); *F03D 7/0292* (2013.01)

(58) Field of Classification Search
CPC ....... F03D 7/0224; F03D 7/024; F03D 7/0292
See application file for complete search history.

(56) References Cited

U.S. PATENT DOCUMENTS

| | | | |
|---|---|---|---|
| 8,430,632 B2 * | 4/2013 | Haag | F03D 7/0264 |
| | | | 415/4.4 |
| 10,167,848 B2 * | 1/2019 | Warfen | F03D 17/00 |
| 2011/0229300 A1 | 9/2011 | Kanev et al. | |
| 2021/0115897 A1 * | 4/2021 | Landa | F03D 7/0224 |

FOREIGN PATENT DOCUMENTS

| | | |
|---|---|---|
| EP | 2329141 A2 | 6/2011 |
| EP | 3892850 A1 | 10/2021 |
| WO | 2010022735 A2 | 3/2010 |

OTHER PUBLICATIONS

International Search Report and the Written Opinion of the International Searching Authority issued on Mar. 20, 2023 for application No. PCT/EP2022/083804.

* cited by examiner

*Primary Examiner* — Nathaniel E Wiehe
*Assistant Examiner* — Jason G Davis
(74) *Attorney, Agent, or Firm* — Schmeiser, Olsen & Watts LLP

(57) ABSTRACT

A method and a device for pitching blades of a wind turbine is provided. The wind turbine is configured to collectively pitch all blades by a collective pitching degree and to individually pitch each blade by an individual pitching degree. If it is determined that at least one blade is unable to reach its individual pitch reference, the individual pitch reference for this blade is prioritized against the collective pitch reference.

7 Claims, 3 Drawing Sheets

Prior Art

METHOD AND DEVICE FOR INDIVIDUALLY PITCHING BLADES OF A WIND TURBINE

CROSS-REFERENCE TO RELATED APPLICATIONS

This application is a national stage of PCT Application No. PCT/EP2022/083804, having a filing date of Nov. 30, 2022, which claims priority to EP Application Serial No. 22151367.4, having a filing date of Jan. 13, 2022, the entire contents both of which are hereby incorporated by reference.

FIELD OF TECHNOLOGY

The following relates to a method and a device for individually pitching blades of a wind turbine. A conventional wind turbine comprises a rotor having a plurality of rotor blades, wherein each blade is configured to be pitched by a pitch angle about a pitch axis of the blade, the rotor is mounted to a nacelle to rotate about a rotation axis with a rotor speed to drive a generator for producing electrical energy, and the nacelle is mounted to a tower. Some wind turbines are configured to collectively pitch all blades by a collective pitching degree and to individually pitch each blade by an individual pitching degree.

BACKGROUND

The pitch position shall be equal to (or very close to) the pitch reference. This is a crucial operation as loads on the turbine are dependent on the pitch position. Under certain conditions, an individual pitch control (IPC) is used to lower the loads due to e.g., high yaw misalignment, high shear, wake situations. This control adds typically a 1P component (a sinusoid with the period time of a single full rotation) to the collective pitch reference. This 1P component is dependent on the azimuth angle of the rotor, and the phase of this sinusoid is shifted by 120 degrees between each of the blades (in a wind turbine having three blades). By doing so, it increases thrust on one side of the rotor and relieves thrust on the other side. This way unbalanced load from yaw errors or high shear can be balanced out or lower the impact on the mechanical components. It keeps the average of the collective pitch position and keeps the desired power production.

If in these situations the pitch reference is not adhered to the blade positions, the loads from these sources will increase, with a risk of overloading the yaw system or hub bending.

There are certain situations where the actual pitch position cannot reach the pitch reference, for example, when there are large forces on the blade due to the wind conditions that the pitch system cannot overcome, when the pitch force is low due to low hydraulic pressure, and/or when the pitch in speed is lower than the pitch speed demanded by the individual pitching. These conditions can hardly be handled by conventional controllers, and there are risks of overloading the mechanical components.

SUMMARY

An aspect relates to a method and a device for individually pitching blades of a wind turbine, which can reduce the loads on the blades.

According to a first aspect of embodiments of the invention, a method of pitching blades of a wind turbine is provided. The wind turbine comprises a rotor having a plurality of rotor blades, each blade being configured to be pitched by a pitch angle about a pitch axis of the blade, the rotor being mounted to a nacelle to rotate about a rotation axis with a rotor speed to drive a generator for producing electrical energy, the nacelle being mounted tower to rotate about a yaw axis, wherein the wind turbine is configured to collectively pitch all blades by a collective pitching degree and to individually pitch each blade by an individual pitching degree. In embodiments, the method comprises the following steps: determining a collective pitch reference for all blades; determining an individual pitch reference for each blade; determining whether at least one blade is unable to reach the individual pitch reference. If it is determined that at least one blade is unable to reach its individual pitch reference, the individual pitch reference for this blade is prioritized against the collective pitch reference.

The loads, which are lowered using the individual pitch control, largely depend on the amplitude of the individual pitch control, the phase and to a small extent on the collective pitch reference. This novel control strategy prioritizes the pitch reference of the individual pitch control over the collective pitch reference in case the pitch system cannot provide both. By this way, excessive loads on the turbine components can be avoided.

In an embodiment, each blade is configured to be pitched towards a production direction, in which the power for driving the generator is increased, and towards a stop direction, in which the power for driving the generator is decreased. If it is determined that the at least one blade is unable to reach its individual pitch reference, the individual pitch reference for this blade is prioritized against the collective pitch reference by shifting the collective pitch reference towards the stop direction. The inventors found out that, when the pitch force is not sufficient for individual pitch control, this usually happens in the direction towards a production direction. Therefore, this embodiment shifts the collective pitch reference towards the stop direction. Although embodiments of the present invention generally work in both directions, there is a particular advantage when pitching of the blades will be limited towards the production direction, wherein a corrective reference offset, for example that of the following embodiment, is added to the collective pitch reference which is then shifted towards the stop direction.

In an embodiment, the step of prioritizing the individual pitch reference for this blade against the collective pitch reference comprises a step of calculating a tracking error of each blade, which is a difference between the individual pitch reference and the actual blade pitch position of each blade; a step of determining a maximum of the calculated tracking errors of the blades; a step of converting the maximum to a corrective reference offset; a step of adding the corrective reference offset to the collective pitch reference to obtain a corrected collective pitch reference; and a step of pitching the blades with the individual pitch references and the corrected collective pitch reference. In this embodiment, the maximum from all tracking errors is taken and not the summation, as the blade with the highest tracking error will provide a sufficient corrective reference offset to the collective pitch reference for all blades that are impacted. If the at least one blade is unable to reach the individual pitch reference, for example if the at least one blade is being unable to be pitched towards the production direction of power production to provide the desired amplitude of the individual pitch control around the collective pitch reference, the collective pitch reference can be moved to stop by a portion of (or the full amplitude of) the (pitch) tracking error to preserve the amplitude of the individual pitch control.

In an embodiment, the step of converting the maximum to the corrective reference offset is made by use of a look-up-table (LUT), where the tracking error caused by an expected system inertia is tolerated without modifying the collective pitch reference by the corrective reference offset. Thereby, the step of prioritizing the individual pitch reference is not performed in case of tracking errors, which are caused by inertia e.g., of the blades and are part of a normal operation.

In an embodiment, the step of prioritizing the individual pitch reference for this blade against the collective pitch reference comprises a step of weighting the individual pitch reference for this blade with a first weight; and a step of weighting the collective pitch reference with a second weight. The first weight is larger than the second weight so that the individual pitch reference for this blade is prioritized against the collective pitch reference. However, at least one of the first and second weights can have the value 1 by default (which means a default weight of 1).

In an embodiment, at least one of the first weight and the second weight is a function of a tracking error of the blade, which is a difference between the individual pitch reference and the actual blade pitch position of the blade, wherein, e.g., the larger the tracking error is, the larger a ratio between the first weight and the second weight is. However, it may also be a constant weight above a certain tracking error, where it does not increase further.

In an embodiment, it is determined that the at least one blade is unable to reach its individual pitch reference, if a tracking error of each blade, which is a difference between the individual pitch reference and the actual blade pitch position of each blade, or a difference between an individual pitching speed reference of the blade and an actual pitching speed of the blade, exceeds a predetermined threshold value.

According to a further aspect of embodiments of the invention, a device for pitching blades of a wind turbine is provided. The wind turbine comprises a rotor having a plurality of rotor blades, each blade being configured to be pitched by a pitch angle about a pitch axis of the blade, the rotor being mounted to a nacelle to rotate about a rotation axis with a rotor speed to drive a generator for producing electrical energy, the nacelle being mounted tower to rotate about a yaw axis. The device is configured to collectively pitch all blades by a collective pitching degree and to individually pitch each blade by an individual pitching degree. The device comprises a first determining unit configured to determine a collective pitch reference for all blades; a second determining unit configured to determine an individual pitch reference for each blade; a third determining unit configured to determine whether at least one blade is unable to reach the individual pitch reference; and a prioritizing unit configured to prioritize the individual pitch reference for this blade against the collective pitch reference, if it is determined by the third determining unit that at least one blade is unable to reach its individual pitch reference.

It has to be noted that embodiments of the invention have been described with reference to different subject matters. Some embodiments have been described with reference to apparatus type claims whereas other embodiments have been described with reference to method type claims. However, a person skilled in the conventional art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION

Some of the embodiments will be described in detail, with reference to the following figures, wherein like designations denote like members, wherein.

DETAILED DESCRIPTION

Figure 1:
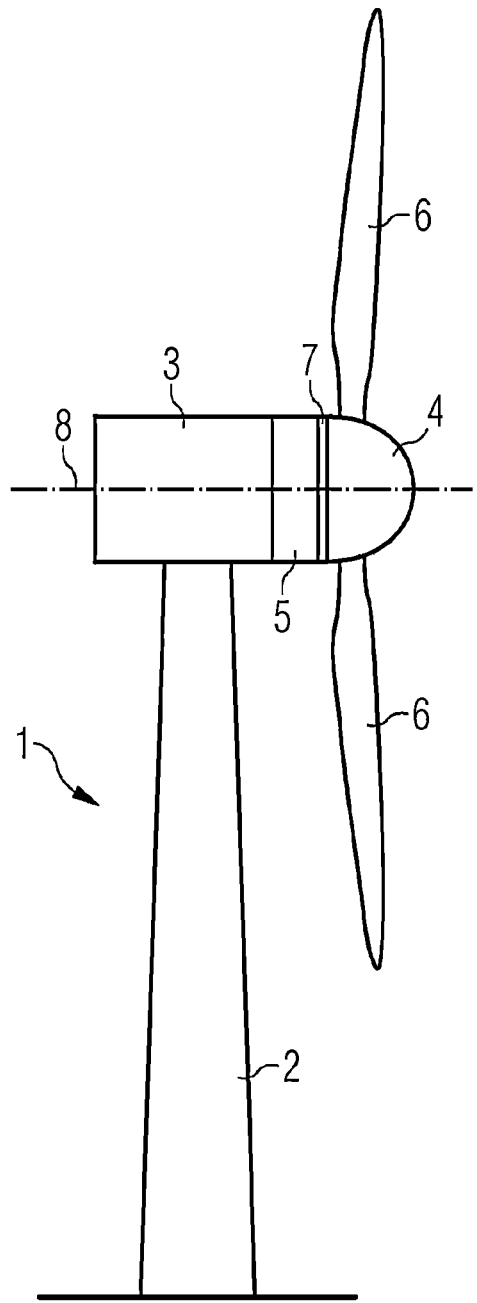
FIG. 1 shows a wind turbine and the different elements thereof.

FIG. 1 shows a wind turbine 1. The wind turbine 1 comprises a nacelle 3 and a tower 2. The nacelle 3 is mounted at the top of the tower 2. The nacelle 3 is mounted rotatable with regard to the tower 2 by a yaw bearing. The axis of rotation of the nacelle 3 with regard to the tower 2 is referred to as the yaw axis.

The wind turbine 1 also comprises a rotor 4 with three rotor blades 6 (of which two rotor blades 6 are depicted in FIG. 1). The rotor 4 is mounted rotatable with regard to the nacelle 3 by a main bearing 7. The rotor 4 is mounted rotatable about a rotation axis 8 (rotor axis).

The wind turbine 1 furthermore comprises a generator 5. The generator 5 in turn comprises a rotor connecting the generator 5 with the rotor 4. If the rotor 4 is connected directly to the generator 5, the wind turbine 1 is referred to as a gearless, direct-driven wind turbine. Such a generator 5 is referred as direct drive generator 5. As an alternative, the rotor 4 may also be connected to the generator 5 via a gear box. This type of wind turbine 1 is referred to as a geared wind turbine. Embodiments of the present invention are suitable for both types of wind turbines 1.

The generator 5 is accommodated within the nacelle 3. The generator 5 is arranged and prepared for converting the rotational energy from the rotor 4 into electrical energy in the shape of an AC power.

The blades 6 can be pitched, i.e., rotated about a longitudinal axis of the blade 6. The wind turbine 1 is configured to collectively pitch all blades 6 by a collective pitching degree and to individually pitch each blade 6 by an individual pitching degree. A method of pitching blades of the wind turbine 1 comprises steps of determining a collective pitch reference for all blades 6, determining an individual pitch reference for each blade 6 and determining whether at least one blade 6 is unable to reach the individual pitch reference.

If it is determined that at least one blade 6 is unable to reach its individual pitch reference, the individual pitch reference for this blade 6 is prioritized against the collective pitch reference.

Prioritizing the individual pitch reference against the collective pitch reference can be made in different ways. In an embodiment, each blade 6 is configured to be pitched towards a production direction, in which the power for driving the generator is increased, and towards a stop direction, in which the power for driving the generator is decreased. If it is determined that the at least one blade 6 is unable to reach its individual pitch reference, the collective pitch reference is shifted towards the stop direction.

Figure 2:
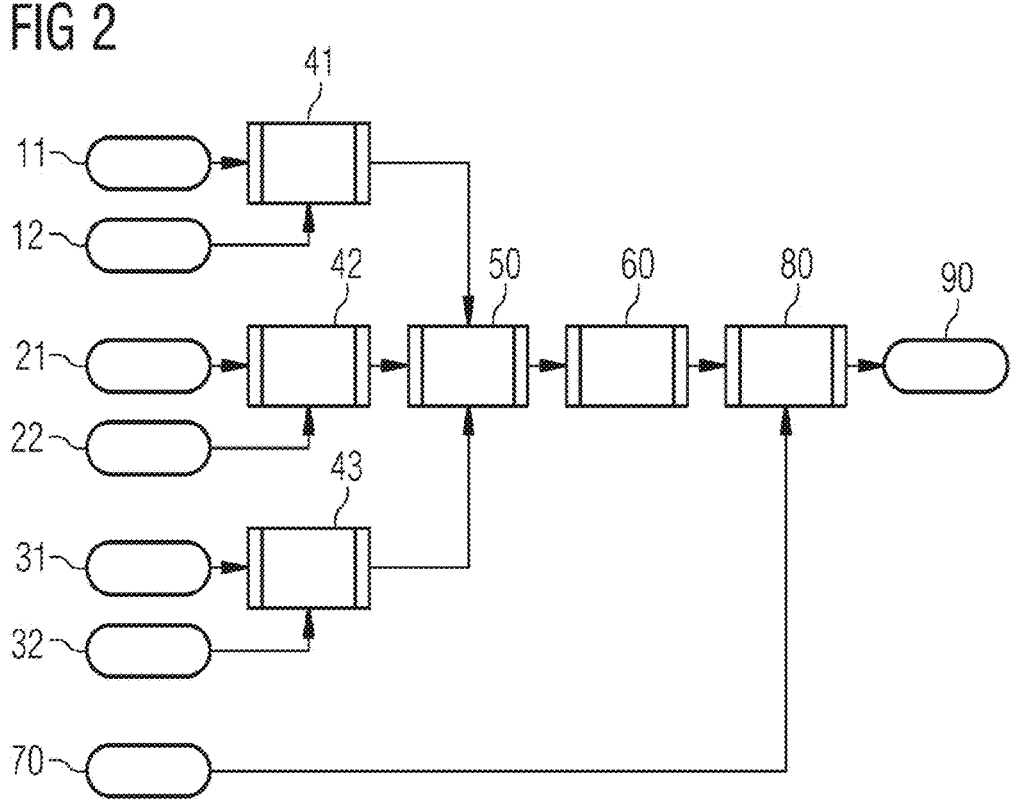
FIG. 2 shows a flowchart of a step of prioritizing an individual pitch reference against a collective pitch reference according to an embodiment.

FIG. 2 shows a flowchart of a step of prioritizing an individual pitch reference against a collective pitch reference according to another embodiment. In this embodiment, the wind turbine 1 comprises three blades 6. In a block 11, a position, i.e., a pitch angle, of a first blade 6 is detected and input into a block 41. An individual pitch reference for the first blade 6 is input from a block 12 into the block 41. In the block 41, a tracking error of the first blade 6 is calculated as a difference between the individual pitch reference for the first blade 6 and the actual position of the first blade 6.

The same is done for the second and third blades 6. In a block 21, a position, i.e., a pitch angle, of a second blade 6 is detected and input into a block 42. An individual pitch reference for the second blade 6 is input from a block 22 into the block 42. In the block 42, a tracking error of the second blade 6 is calculated as a difference between the individual pitch reference for the second blade 6 and the actual position of the second blade 6. In a block 31, a position, i.e., a pitch angle, of a third blade 6 is detected and input into a block 43. An individual pitch reference for the third blade 6 is input from a block 32 into the block 43. In the block 43, a tracking error of the third blade 6 is calculated as a difference between the individual pitch reference for the third blade 6 and the actual position of the third blade 6.

The three tracking errors of the three blades 6 are input into a block 50, where a maximum of the three tracking errors is determined. The determined maximum tracking error is input from the block 50 into a block 60, where the determined maximum tracking error is converted to a corrective reference offset.

The corrective reference offset is input from the block 60 into a block 80. In addition, a collective pitch reference for all blades 6 is input from a block 70 into the block 80. In the block 80, the corrective reference offset and the collective pitch reference are added to obtain a corrected collective pitch reference in a block 90. Eventually, the blades 6 are pitched with the individual pitch references and the thus corrected collective pitch reference.

In another embodiment, the step of prioritizing the individual pitch reference for the respective blade 6 against the collective pitch reference comprises a step of weighting the individual pitch reference for this blade 6 with a first weight, and a step of weighting the collective pitch reference with a second weight. The first weight is larger than the second weight. One of the first and second weights can be 1 by default. In a modified embodiment, at least one of the first weight and the second weight is a function of a tracking error of the blade 6, which is a difference between the individual pitch reference and the actual blade pitch position of the blade 6.

There are many ways to determine that the at least one blade 6 is unable to reach its individual pitch reference. For example, it can be determined that the at least one blade 6 is unable to reach its individual pitch reference, if a tracking error of each blade 6, which is a difference between the individual pitch reference and the actual blade pitch position of each blade 6, or a difference between an individual pitching speed reference of the blade 6 and an actual pitching speed of the blade 6, exceeds a predetermined threshold value.

Figure 3:
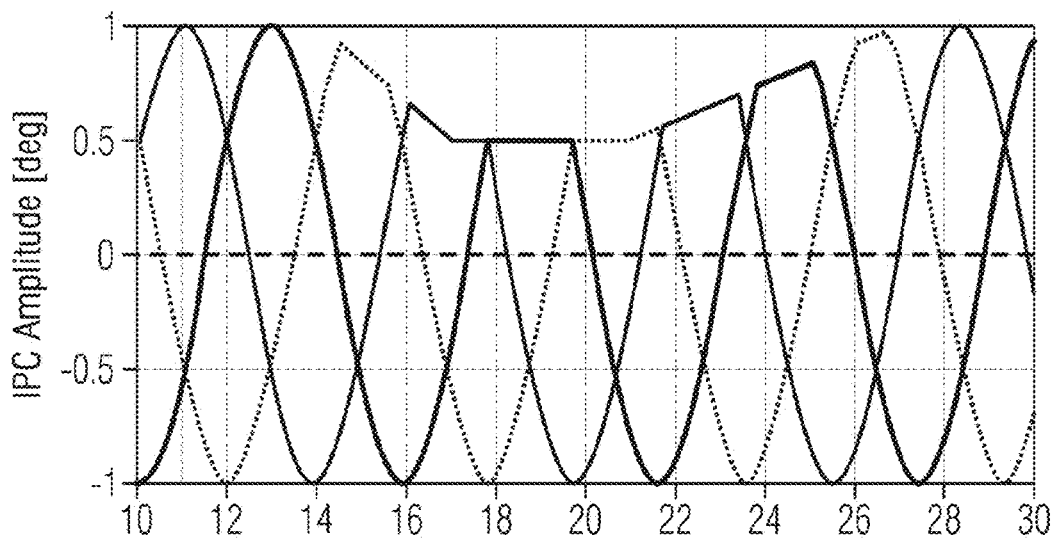
FIG. 3 shows pitching amplitudes in an individual pitch control according to the prior art.

FIG. 3 shows pitching amplitudes in an individual pitch control according to the prior art. The solid lines indicate the amplitudes of the individual pitch control for each of the three blades 6. The dotted line shows the collective pitch reference which in this example is constant/unchanged. The amplitudes in the individual pitch control in the middle area are limited by lack of a pitch force. All three blades 6 are unable to reach their individual pitch references.

Figure 4:
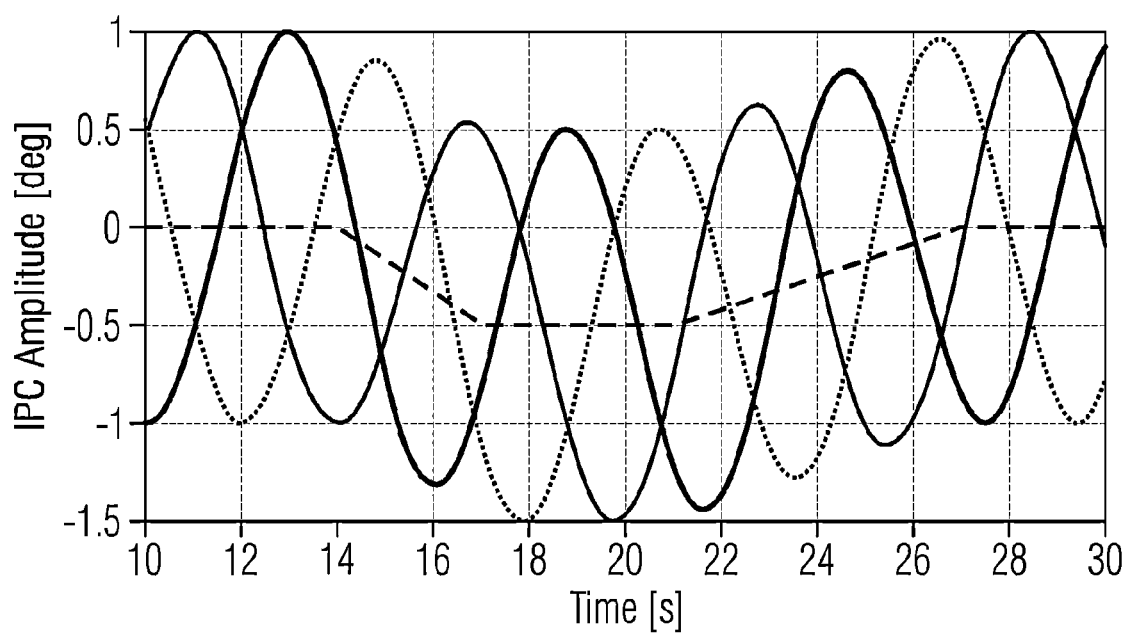
FIG. 4 shows pitching amplitudes in an individual pitch control according to an embodiment of the present invention.

FIG. 4 shows pitching amplitudes in an individual pitch control according to an embodiment of the present invention. The solid lines indicate the amplitudes of the individual pitch control for each of the three blades 6. The dotted line shows the collective pitch reference. The control strategy of embodiments of the present invention shows the solution where the collective pitch reference is lowered to preserve the amplitudes of the individual pitch control. The amplitudes of the individual pitch control are reached/maintained, and therefore the load targets in the individual pitch control in this situation are kept under control, whereas in conventional art of FIG. 3, the effectiveness of the individual pitch control is reduced, and loads are increased.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of pitching blades of a wind turbine, the wind turbine comprising a rotor having a plurality of rotor blades, each blade being configured to be pitched by a pitch angle about a pitch axis of the blade, the rotor being mounted to a nacelle to rotate about a rotation axis with a rotor speed to drive a generator for producing electrical energy, the nacelle being mounted to a tower, wherein the wind turbine is configured to collectively pitch all blades by a collective pitching degree and to individually pitch each blade by an individual pitching degree, wherein each blade is configured to be pitched towards a production direction, wherein the power for driving the generator is increased, and towards a stop direction, wherein the power for driving the generator is decreased; the method comprising:
determining a collective pitch reference for all blades;
   determining an individual pitch reference for each blade;
   determining whether at least one blade is unable to reach the individual pitch reference;
   if it is determined that the at least one blade is unable to reach the individual pitch reference, prioritizing the individual pitch reference for the at least one blade against the collective pitch reference by shifting the collective pitch reference towards the stop direction; and
   pitching each blade according to the individual pitch references and the shifted collective pitch reference.

2. The method according to claim 1, wherein
the step of prioritizing the individual pitch reference for this blade against the collective pitch reference comprises:
calculating a tracking error of each blade, which is a difference between the individual pitch reference and an actual blade pitch position of each blade;
determining a maximum of the calculated tracking errors of the blades;
converting the maximum to a corrective reference offset;
adding the corrective reference offset to the collective pitch reference to obtain a corrected collective pitch reference; and pitching the blades with the individual pitch references and the corrected collective pitch reference.

3. The method according to claim 2, wherein the step of converting the maximum to the corrective reference offset is made by use of a look-up-table, where the tracking error caused by an expected system inertia is tolerated without modifying the collective pitch reference by the corrective reference offset.

4. The method according to claim 1, wherein
the step of prioritizing the individual pitch reference for the at least one blade against the collective pitch reference comprises:
weighting the individual pitch reference for the at least one blade with a first weight;
weighting the collective pitch reference with a second weight;
wherein the first weight is larger than the second weight.

5. The method according to claim 4, wherein
at least one of the first weight and the second weight is a function of a tracking error of the at least one blade, which is a difference between the individual pitch reference and the actual blade pitch position of the at least one blade;
wherein the larger the tracking error is, the larger a ratio between the first weight and the second weight is.

6. The method according to claim 1, wherein
it is determined that the at least one blade is unable to reach its individual pitch reference, if a tracking error of each blade, which is a difference between the individual pitch reference and the actual blade pitch position of each blade, or a difference between an individual pitching speed reference of the blade and an actual pitching speed of the blade, exceeds a predetermined threshold value.

7. A device for pitching blades of a wind turbine, the wind turbine comprising a rotor having a plurality of rotor blades, each blade being configured to be pitched by a pitch angle about a pitch axis of the blade, the rotor being mounted to a nacelle to rotate about a rotation axis with a rotor speed to drive a generator for producing electrical energy, the nacelle being mounted to a tower, wherein the device is configured to collectively pitch all blades by a collective pitching degree and to individually pitch each blade by an individual pitching degree, wherein each blade is configured to be pitched towards a production direction, wherein the power for driving the generator is increased, and towards a stop direction, wherein the power for driving the generator is decreased; the device comprising:
a controller configured to:
determine a collective pitch reference for all blades;
determine an individual pitch reference for each blade;
determine whether at least one blade is unable to reach the individual pitch reference;
prioritize the individual pitch reference for the at least one blade against the collective pitch reference, by shifting the collective pitch reference towards the stop direction, if it is determined by the third determining unit that the at least one blade is unable to reach the individual pitch reference; and
pitch each blade according to the individual pitch references and the shifted collective pitch reference.

* * * * *